May 5, 1953
G. M. GRAHAM
2,637,118
CONNECTING ROD ALIGNER
Filed July 9, 1949
2 SHEETS—SHEET 1
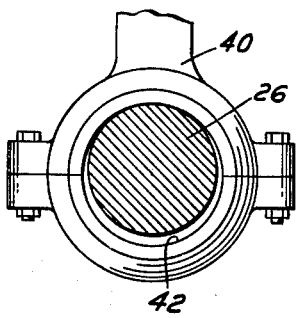
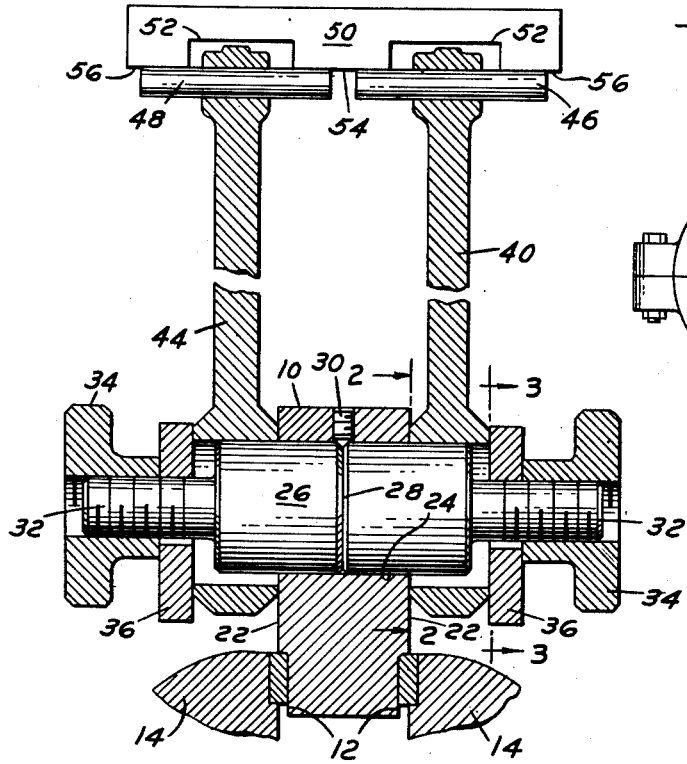
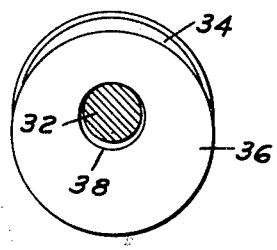
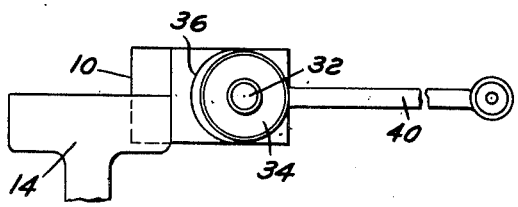
INVENTOR.
GEORGE M. GRAHAM
BY
Burton & Parker
ATTORNEYS

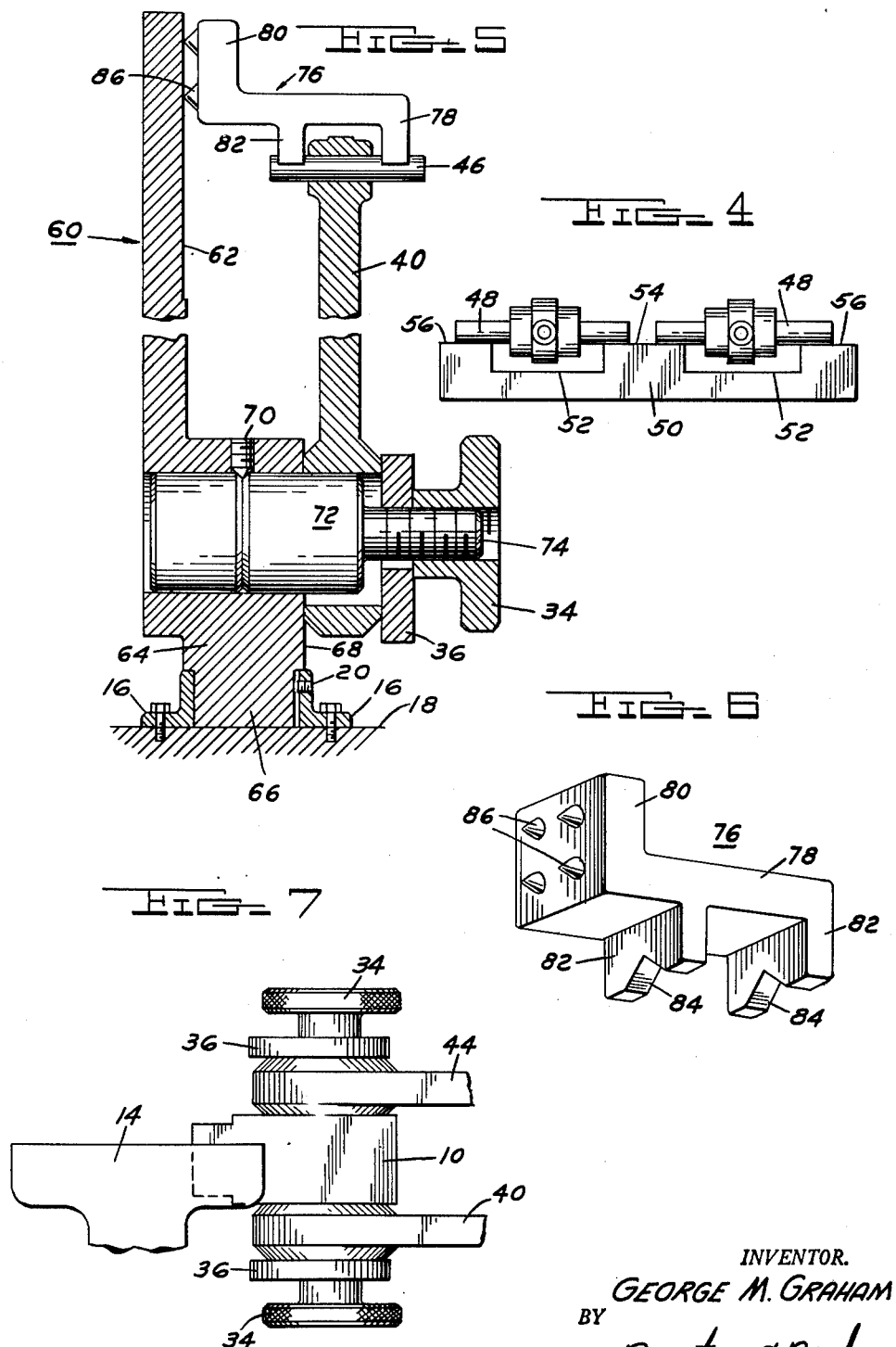

Patented May 5, 1953

2,637,118

UNITED STATES PATENT OFFICE 2,637,118

CONNECTING ROD ALIGNER

George M. Graham, Detroit, Mich., assignor to Kent-Moore Organization, Inc., Detroit, Mich., a corporation of Michigan Application July 9, 1949, Serial No. 103,839

6 Claims. (Cl. 33—180)

This invention relates to aligning devices and particularly to an improved connecting rod aligner.

Heretofore it has been the practice to provide fixtures for testing and correcting connecting rods for internal combustion engines having a fixed arbor of either the solid or expansion type upon which the connecting rod was mounted for the testing operation. In these devices the solid arbor was shaped to fit the connecting rod and in view of the many sizes of connecting rods a large number of arbors were required for each device. In attempting to overcome this disadvantage, the expansion type of arbor was developed to accommodate the arbor to various sizes of connecting rods. However, the expansion type of arbor has been relatively expensive to manufacture and was limited in range.

An important object of this invention is to provide an aligning device for connecting rods which eliminates the need of special arbors and materially reduces the cost of manufacturing the tool while at the same time providing a highly accurate and quickly obtainable alignment check. Another important object of the invention is to provide an improved connecting rod aligner which utilizes a novel clamping means for abuttingly engaging a side portion of the connecting rod with a surface of the aligner to secure it in proper position for testing. A further important object of the invention is to provide a connecting rod aligner of this character which is formed of few parts, is rugged and durable in construction, and optionally may employ a master connecting rod, a conventional commercial connecting rod, or a face plate for the purpose of testing a suspected inaccurate connecting rod and for making corrections thereto to bring it into accurate alignment.

In carrying out the invention, the connecting rod aligner of the present invention utilizes the side face of the crank shaft end of the connecting rod to be tested as the contacting or bearing surface for predeterminedly setting up the connecting rod for the testing operation. Heretofore, it has been the practice to mount the bore of the connecting rod through which the crank shaft extends upon an arbor which is machined to slidably fit therein. In the present invention, in order to hold the connecting rod to be tested upon the device in the proper position, novel clamping means is provided which forces a side portion of the connecting rod against a flat face of the aligner body to hold the two against movement relative to one another. For comparison checking purposes, a removable member of the aligner may comprise a master connecting rod, an ordinary new or used connecting rod, or a face plate. When two connecting rods are employed in the use of the aligner they are mounted upon the aligner so as to extend in substantially the same plane and in spaced parallel relationship to one another. By means of a novel checking tool one connecting rod can be tested against the other connecting rod, and regardless of the fact that both of them are misaligned, they are both capable of being bent or twisted while on the aligner to bring them into accurate alignment. In a modification of the invention, a face plate may be utilized in lieu of the master connecting rod.

Various other objects, advantages and meritorious features of the invention will become more fully apparent from the following specification, appended claims and accompanying drawings wherein:

Fig. 1 is a vertical cross sectional view through a connecting rod aligner of the present invention showing the same secured in a vise and carrying two connecting rods, Fig. 2 is a vertical cross sectional view on line 2—2 of Fig. 1 illustrating the undersize character of the arbor upon which the connecting rod is mounted, Fig. 3 is a vertical cross sectional view taken along line 3—3 of Fig. 1 illustrating one of the clamping collars of the device and its eccentric and oversize relation to the reduced extension of the arbor, Fig. 4 is a top plan view of two connecting rods showing the manner of utilizing a novel checking gauge for testing the alignment thereof, Fig. 5 is a vertical sectional view through a modified form of connecting rod aligner embodying the features of the invention and utilizing a face plate in lieu of another connecting rod for checking purposes, Fig. 6 is a perspective view of an alignment checking gauge utilized with the device illustrated in Fig. 5, Fig. 7 is a side elevation of the connecting rod aligner of Fig. 1 illustrating a side projecting position of the aligner in a vise, having two connecting rods in superimposed position, and Fig. 8 is a side elevation similar to Fig. 7 but with the aligning device turned 90° relative thereto and mounted in a vise with the connecting rods extending in the same horizontal plane.

The aligner illustrated herein is adapted for support by any suitable means on a work bench or the like such as by the use of a vise or other fixture. The aligner comprises a central member or body 10 which forms the primary supporting element thereof. One end of the body is reduced in thickness as at 12 in order that it may be received between the jaws 14—14 of a vise illustrated in Fig. 1 or between holding members 16—16 illustrated in Fig. 5. In the latter form of support, each holding member 16 is preferably a bar of L-shaped cross section and is bolted or otherwise secured to the top of a work bench 18. In this last mentioned form of support, one or more set screws 20 are provided each preferably carried by one of the bars for rigidly clamping the block 10 in the upright position shown.

The body 10 is constructed such that the opposite side faces thereof, indicated at 22—22, are in accurate parallel relationship to one another. To accomplish this purpose, opposite sides of the body may be machine finished as in conventional practice to bring the opposite faces into highly accurate parallel relationship. Extending through the body from one face to the other face thereof is a circular opening or bore 24, the axis of which is preferably located further away from the reduced end of the body than the opposite end as shown in Figs. 1 and 5. The bore 24 is machined or otherwise formed so that its axis extends in accurate perpendicular relationship to the two side faces 22—22. Removably located in the bore and slidably fitting the same is a cylindrical member or arbor 26. The arbor is machine finished so that it slidably but tightly fits the bore. It is of such a length that when centrally mounted within body 10 the opposite ends project beyond the side faces 22—22.

In order to hold the arbor in central position in the body 10, the arbor is provided with a peripheral groove 28 midway between the opposite ends, and entering the groove is a removable screw member 30 threaded into the upper end of the body 10 and tapered at its inner end for engagement with the side walls of the groove. Thus mounted, the opposite end sections of the arbor project beyond the side wall surfaces 22—22. The extent of the projection of the ends of the arbor beyond the body 10 forms an important part of the invention as is hereinafter described.

The arbor 26 is provided with reduced end extensions or studs of corresponding shape and formation as shown at 32—32. These extensions are externally threaded and received on each of these extensions is a clamping nut 34 which is threaded to the extension for threaded travel thereon. Associated with each clamping nut is an annular member or collar 36 which is slidably received on the extension and is located between the clamping nut 34 and the main body portion of the arbor. Each collar 36 is preferably a hardened steel washer whose opposite side faces are in parallel relationship to one another.

An important feature of the invention is the relation of the various parts of the aligner heretofore described to the one or more connecting rods which are assembled thereon for testing purposes. One important feature of the invention is the fact that the arbor 26 is undersize the bore of the connecting rod which receives the crank shaft of the internal combustion engine. It is not essential to the practice of this invention that the arbor be constructed and machined finished so that it slidably fits the bore of the connecting rod which receives the crank shaft as has heretofore been the practice. As shown in Figs. 1, 2 and 5, the arbor 26 is considerably undersize the crank shaft bore of the connecting rods illustrated therein. Another important feature of the invention is the construction such that when the arbor is centrally positioned in the body 10 as illustrated in Figs. 1 and 5, the wider end sections that protrude or project from the body 10 extend axially less than the bore of the connecting rod which receives the crank shaft. Another important feature of the invention is the utilization of clamping collars 36 on one or both ends of the arbor which abut the side of the journal end of the crank shaft and force the opposite side thereof against the flat machined face 22 of the body. These collars are preferably eccentric in formation as shown in Fig. 3 and provided with a circular opening 38 therethrough which is oversize the reduced stud extensions 32 of the arbor. It is evident that the arbor of the illustrated embodiments of the invention serves merely as a support or rest for the connecting rod under test and associated parts for clamping the connecting rod against a flat face of the aligner.

In use of the apparatus thus far described, the journaled end of a connecting rod 40 is mounted upon the wider end section of the arbor 26 as shown in Fig. 1 and clamped against the machined face 22 of the body 10 by means of the collar 36 and the tightening nut 34. The arbor merely serves as a rest or support upon which the connecting rod is mounted, and as shown in Figs. 1 and 2 the crank shaft bore of the connecting rod, indicated at 42, is oversize the arbor. Threading the nut 34 on the arbor will urge the collar 36 against the adjacent side face of the journal end of the connecting rod and force the opposite side thereof against the face 22 of the body 10. By virtue of the fact that the journal mounting of the connecting rod has an axial depth greater than the projecting wider portion of the arbor, the collar 36 is free to move against the connecting rod and shift the latter against the body as is clearly evident in Fig. 1.

Various means may be employed in order to test the connecting rod 40 mounted on the aligner. Fig. 1 illustrates the use of another connecting rod 44 which may be either a master testing rod or another rod produced for commercial use. If it is a master rod, it is initially constructed with the parts thereof in accurate alignment. The connecting rod 44 is mounted upon the arbor 26 in the same manner as the previously described connecting rod 40. The clamping collar 36 and the nut 34 on the left side of the aligner as viewed in Fig. 1 are used to mount the connecting rod 44 in properly clamped position against the machined face of the body 10. The two connecting rods 40 and 44 are mounted on the aligner so that they extend in parallel relationship with their upper piston carrying ends in side by side relationship as shown in Fig. 1. The piston pin for each connecting rod is inserted through its respective bore as shown in Fig. 1. The piston pin for connecting rod 40 is indicated at 46, and similarly the piston pin for connecting rod 34 is indicated at 48. The two piston pins are brought into substantial alignment as shown in Fig. 1 and the connecting rod 40 is ready for the testing operation.

In order to test for misalignment of the connecting rod 40, there is provided a novel form of gauge block indicated at 50. The gauge is elongated in one dimension in order that it may be applied to the upper ends of both of the connecting rods 40 and 44 mounted on the apparatus. One side edge of the gauge is recessed at two areas 52—52 for the purpose of straddling the upper ends of the connecting rods in the manner shown in Fig. 1. The recessed edge of the gauge is provided with ground surfaces which are straight with a relatively high degree of accuracy. One such surface is indicated at 54 and bears upon the inner ends of the two piston pins 46 and 48. The opposite ends of the gauge carry two such ground surfaces 56—56 which bear on the respective outer ends of the piston pins 46 and 48. The gauge block 50 is usually provided with a ground straight edge in which the two recesses are later cut out.

In the operation of the device the connecting rod 40 will be in properly aligned condition when the projecting ends of the piston pin 46 thereof make full contact with the two ground surfaces 54 and 56 of the gauge block on the opposite sides of the recess 52. The test of the gauge block should be made at least in two planes approximately 90° apart. As shown in Fig. 1 the gauge block 50 is disposed in the plane of the connecting rod under test. In the top view of Fig. 4, the gauge block is shown on one side of the connecting rods and in lateral projecting relation to the piston pins thereof. The gauge block may be slidably shifted between these two positions and if full contact is not made with the piston pins throughout this movement the connecting rod under test is not in proper aligned position. If such misalignment occurs, a tool may be used to either bend or twist the connecting rod to bring it into proper contact with the gauge block 50.

It is possible to use the apparatus with two ordinary commercially used connecting rods, one or both of which may be in misaligned condition. Using the same arbor construction and the same gauge block, two commercially used connecting rods are mounted in side by side relationship in the manner shown in Fig. 1 and with their respective piston pins in substantially aligned position in order to use the gauge block in the manner previously described. If either one or both of the connecting rods are not in aligned condition, the gauge block will not properly sit upon the piston pins and clearances between the ground surfaces thereof and the piston pins will occur. In such event, the proper tool is used to bend or twist either one or both connecting rods until full contact of the ground surfaces of the gauge with the piston pins is obtained. When that occurs, the two connecting rods are then in properly aligned condition. This correcting operation may be performed even when both connecting rods are out of alignment, and regardless of the extent of misalignment of either one or both of the rods, they may be brought into properly aligned condition by twisting and bending the rods until the gauge block fully contacts both of the rods in the manner described above.

In lieu of a connecting rod for testing purposes, a gauge plate may be used from which the alignment of the connecting rod may be noted. Such a gauge plate is shown in Fig. 5 and generally indicated at 60. The gauge plate includes an inner flat face 62 which is machined finished or otherwise shaped so that the plane thereof extends perpendicularly to the axis of the bore in which the arbor is received. Although the gauge plate may be a separate member and mounted on a projecting end of the arbor 26 similar to the connecting rod 44, it is preferred to form the gauge plate integral with the block portion of the aligner which is gripped by the vise or other securing means. Fig. 5 illustrates the latter construction wherein the gauge plate 60 is integrally joined to the block portion 64 of the aligner. The balance of the latter is constructed similar to the body 10 previously described including the reduced end 66, a connecting rod abutting face 68 and a releasable locking screw 70. The arbor of the embodiment of the invention illustrated in Fig. 5 is indicated at 72 and is similar to the arbor 26 previously described except that only one reduced threaded extension or stud 74 is provided for receiving the clamping collar 36 and the nut 34 for holding the connecting rod 40 under test on the aligner. The two faces 62 and 68 of the aligner are formed in accurate parallel relation. Thus, the gauge plate extends in accurate perpendicular relationship to the axis of the arbor and parallel to the face 68 of the supporting member against which the connecting rod to be tested is forced.

In order to use the gauge plate illustrated in Fig. 5, a testing member or gauge of the character generally illustrated in my earlier patents No. 2,137,484, and No. 2,336,860 and indicated at 46 and 60 respectively in the drawings thereof may be used. This gauge is generally indicated at 76 in Figs. 5 and 6 and is constructed so that it straddles the piston pin 46 of the connecting rod 40 shown in Fig. 5 and abuts the inner face 62 of the gauge plate. The gauge 76 is of L-shape configuration, including when in use a horizontal portion 78 and a vertical portion 80. The horizontal portion 80 is provided with spaced parallel depending flanges 82—82 in each of which is formed a corresponding V-shaped notch or indentation 84. The vertical portion 80 of the gauge is provided with a plurality of correspondingly formed spaced apart pins or nibs 86. In the testing operation, the two flanges 82—82 straddle the upper end of the connecting rod in order to have the V-shaped notches 84—84 receive and be brought into abutment with the opposite end sections of the wrist pin 46. Proper alignment is indicated when all the nibs 86 of the gauge contact the face 62 of the plate 60. If all of the nibs do not contact the face of the gauge, improper alignment is shown. If improper alignment is indicated, the connecting rod may be bent or twisted by tools customarily used for this purpose until all the nibs make contact with the face plate. The gauge 76 may also be used to determine whether the pistons on the connecting rods are in proper alignment in the manner shown in Fig. 5 of my Patent No. 2,336,860 previously referred to.

An important feature of the invention is the ability to not only support the one or more connecting rods employed in a vertical plane but also if desired to mount them in horizontal planes in the manner shown in Figs. 7 and 8. As shown in Fig. 7, the supporting member 10 of the aligner is mounted in the vise so that its major axis extends in horizontal plane and projects from one side of the vise. In the position illustrated in Fig. 7, the jaws of the vise 14 grip the opposite sides 22—22 of the supporting member 10. In this position, the two connecting rods illustrated therein at 40 and 44 are superimposed one above the other. In Fig. 8, the body 10 is turned 90° to that illustrated in Fig. 7 and the jaws of the vise grip the reduced end 12 of the body 10. In this position, the two connecting rods 40 and 44 extend in the same horizontal plane. In either position, the gauge block 50 may be used to test the alignment of the connecting rods in the manner previously described. Thus, by providing a supporting member of the character of the body 10, the aligner may be used in any desired position to suit the convenience of the operator.

What I claim is:

1. In a connecting rod alignment checking and correcting fixture, a fixed body having a flat machined finished surface on one side thereof and a bore opening out through said flat surface in axial perpendicular relation thereto, a cylindrical arbor received in said bore, means for releasably locking said arbor in the bore such that one end section thereof projects outwardly from said flat surface a distance less than the axial dimension of the crank shaft journal end of a connecting rod for which the fixture is intended, said end section of the arbor having a reduced externally threaded stud forming an axial extension to the projecting end section of the arbor, a nut threaded on said stud, an axially movable flat side collar encircling said stud between the nut and the projecting end section of the arbor and having a radial dimension greater than that of the arbor such that the collar is engageable with the crank shaft journal end of a connecting rod received over said projecting end section of the arbor, said collar having its opposite flat faces extending in parallel relationship and cooperating with the nut to clamp the crank shaft journal end of a connecting rod on the projecting end section of the arbor against said flat machined finished surface of the body.

2. In a connecting rod alignment checking and correcting fixture, a rectangularly shaped body having a flat machined finished surface on one side thereof and a bore therein opening out through said flat surface in axial perpendicular relation thereto, a cylindrical arbor received in said bore and provided with a peripheral groove located within the bore, means carried by the body and engageable in said groove for releasably locking the arbor in the bore, said means and said peripheral groove being so related to one end of the arbor that the same projects outwardly from said flat surface a distance less than the axial dimension of the crank shaft journal end of a connecting rod for which the fixture is intended, said projecting end section of the arbor having a reduced externally threaded stud forming an axial extension to the projecting end of the arbor, a nut threaded on the outer end of said stud, an axially movable circular collar having its opposite side faces machined finished to accurate parallel relation and loosely mounted on said stud between the nut and the arbor, said collar having a radial dimension greater than that of the arbor such that the collar is engageable with the crank shaft journal end of a connecting rod received over the projecting end section of the arbor, said collar further having its opposite end faces extending in accurate parallel relationship and cooperating with the nut when the latter is threadedly advanced to clamp the crank shaft journal end of a connecting rod received on said arbor against said flat surface of the body.

3. In a connecting rod alignment checking and correcting fixture, a fixed body having flat machined finished surfaces on the opposite sides thereof extending in accurate parallel relationship with one another, said body having a bore therethrough opening out through said flat surfaces in axial perpendicular relation thereto, a cylindrical arbor received in said bore, said arbor having an axial length greater than said bore but less than the combined axial dimensions of the bore and two crank shaft journal ends of connecting rods for which the fixture is intended, means for releasably locking said arbor in said bore such that the opposite end sections of the arbor project outwardly from each flat surface a distance less than the axial dimension of the crank shaft journal end of any connecting rod for which the fixture is intended, said projecting end sections of the arbor each having a reduced externally threaded stud forming an axial extension thereto, a nut threaded on the outer extremity of each stud, an axially movable collar encircling each stud of the arbor between the same and the nut and having a radial dimension greater than that of the arbor such that it is engageable with the crank shaft journal end of a connecting rod received over the projecting end section of the arbor, each of said collars having its opposite end faces extending in accurate parallel relationship and operable to clamp the crank shaft journal end of a connecting rod received over the arbor against the adjacent machined finished surface of the body upon threaded advancement of the nut with which the collar is associated.

4. In a fixture for checking the alignment of connecting rods of internal combustion engines, a fixed body having at least a portion of each of two opposite sides thereof provided with a flat machined finished surface extending in accurate parallel relationship with the machined finished surface of the other side, an end section of an arbor projecting from each of said machined finished surfaces of the body less than the axial dimension of the crank shaft journal bore of the connecting rod for which the fixture is intended, each of said end sections merely serving as a rest for receiving the crank shaft journal bore of the connecting rod, means carried on each projecting arbor end section for engaging the adjacent side of the journal end of a connecting rod supported on the end section and force the opposite side of the journal end into engagement with the adjacent machined finished surface of the body, and means for checking the alignment of the connecting rods thus mounted on the arbor end sections of the fixture, said means comprising an elongated member shaped to straddle the piston pin receiving ends of the connecting rods and simultaneously engage the opposite ends of each of the piston pins received in their respective connecting rods.

5. In a connecting rod alignment checking and correcting fixture, a body having a flat face on at least one side thereof, a cylindrical arbor of a diameter to receive the crank shaft journal bore of a connecting rod, said arbor being attached to said body and projecting outwardly from said flat face in axial perpendicular relation thereto and for a distance less than the axial dimension of the crank shaft journal bore of a connecting rod for which the fixture is intended, a member having a flat face, means mounting the member on the arbor for bodily movement toward and away from the body and with its flat face in opposed relation to the flat face of the body, and means for drawing said member toward the body to clampingly hold the crank shaft end of a connecting rod resting on the arbor between the flat faces of the member and the body.

6. A connecting rod checking and alignment fixture as defined in claim numbered 5 characterized in that the side of the body opposite to said flat face is provided with a gauge plate which extends radially with respect to the arbor away from the body in parallelism to said flat face of the body.

GEORGE M. GRAHAM.

References Cited in the file of this patent

UNITED STATES PATENTS

| Number | Name | Date |
|---|---|---|
| Re. 22,953 | Praeg | Dec. 23, 1947 |
| 1,271,018 | Chamberland | July 2, 1918 |
| 1,575,797 | Shaw | Mar. 9, 1926 |
| 1,576,594 | Froussard | Mar. 16, 1926 |
| 1,677,424 | Allen | July 17, 1928 |
| 1,905,102 | Johnson | Apr. 25, 1933 |
| 1,910,174 | Miller | May 23, 1933 |
| 2,137,484 | Graham | Nov. 22, 1938 |
| 2,336,845 | Christensen | Dec. 14, 1943 |
| 2,336,860 | Graham | Dec. 14, 1943 |

FOREIGN PATENTS

| Number | Country | Date |
|---|---|---|
| 840,287 | France | Jan. 11, 1939 |

OTHER REFERENCES

Publ.: Automobile Repairshop Short-Cuts, page 77, Connecting-rod gage (No. 542), 1918, U. P. C. Book Co., 243 W. 39th Street, New York, N. Y.